United States Patent [19]

Ponczek et al.

[11] 3,942,247

[45] Mar. 9, 1976

[54] CAN OPENER WITH BAG OPENER ATTACHMENT

[75] Inventors: George Mark Ponczek, Chicago; Herman Owen DeBoer, Jr., Wheaton, both of Ill.

[73] Assignee: Sunbeam Corporation, Chicago, Ill.

[22] Filed: Aug. 2, 1974

[21] Appl. No.: 494,116

[52] U.S. Cl. .................... 30/6.5; 29/453; 30/296 R

[51] Int. Cl.[2] .................... B67B 7/44; F16B 1/00

[58] Field of Search ......... 7/14.2 R; 29/453; 30/6.5, 30/123 R, 142, 294, 296 R, 315; 248/73; 81/3.3 R, 3.3 A, 3.31, 3.32, 3.33

[56] References Cited

UNITED STATES PATENTS

| | | | |
|---|---|---|---|
| 3,253,084 | 5/1966 | Taylor | 248/73 X |
| 3,315,352 | 4/1967 | Scott | 30/4 R |
| 3,803,713 | 4/1974 | Jones | 30/2 X |
| 3,824,688 | 7/1974 | Goffe | 30/294 |

*Primary Examiner*—Al Lawrence Smith
*Assistant Examiner*—Gary L. Smith
*Attorney, Agent, or Firm*—George R. Clark; Neil M. Rose; John S. Pacocha

[57] ABSTRACT

A motor driven can opener is provided with a bag opener having a cutting blade with supporting means which cooperates with the can opener housing whereby the cutting blade is retained without the use of screws or other assembly means and is easily removable for replacement. The supporting means and the housing form an enclosure for the blade with an opening which provides access to the sharpened edge of the blade so that a bag to be opened may be engaged with the blade.

4 Claims, 5 Drawing Figures

PLASTIC BAG OPENER

CAN OPENER WITH BAG OPENER ATTACHMENT

BACKGROUND OF THE INVENTION

In recent years, the motor-operated, electric can opener has become one of the most popular and commercially important small electric appliances. Since it is a relatively simple appliance, it is easy for small manufacturers to design and tool to manufacture an electric can opener. Accordingly, the field has become very competitive with large numbers of manufacturers sharing the more than five million units a year can opener market in the United States. Because of the vigorous competition in the field, the addition of features incorporated in the current can openers and improvements in quality has become very important. Some of these additional features involve increasing the functions performed by the can opener through incorporation of knife sharpeners, ice crushers, juicers and the like with the can opener. The lack of space in the kitchen and the fact that the can opener usually occupies a convenient and readily accessible position makes these multipurpose, combination appliances particularly desirable.

Although at one time almost all preserved food purchased in the store was sold in cans, with the advent of flexible plastic materials, it is common for foods to be packaged and sold in plastic bags. Such plastic bags are being used increasingly to bag commercially available foods, especially frozen foods, and are also increasingly being used in the home to bag homemade foods and left-overs. This plastic material is heavy and almost impossible to tear or rip without a knife or scissors. Even if the housewife takes the time to locate a knife or scissors to open the plastic bag, the results are sometimes unsatisfactory because of the risk of injury when puncturing the bag with a hand-held sharp object.

It would be convenient and desirable to have a single appliance which would have the capability of easily opening various different types of food containers such as metal cans and plastic bags.

SUMMARY OF THE INVENTION

The present invention provides an improved can opener which is simple to manufacture and at the same time includes new features which have heretofore been unavailable on similar type appliances for opening other types of food products. The invention involves the placement of a blade contained within an assembly located on the front portion of a conventional can opener. Thus, one is obviously able to use this common appliance for opening standard metal cans and also to easily open the increasingly popular plastic bag food containers.

The plastic bag opener located on the can opener housing making up the present invention is also designed so that the plastic bag opener casing can be easily removed from the can opener housing to facilitate both the cleaning of the appliance and the replacement of the blade used within the plastic bag opener. The plastic bag opener casing is attached to the can opener housing by use of plastic latching means integrated with the bag opener casing itself. In this fashion, there is no need for screws or other such extraneous hardware which would complicate the removal of the bag opener casing. The use of the aforementioned casing latching means also provides an easier and less expensive manufacturing process.

The blade contained within the plastic bag opener casing of the present invention is also designed and located in such a manner as to facilitate the removal and replacement of said blade. That is to say, there are a number of plastic support members which have been formed within the plastic bag opener housing and on the front portion of the can opener housing which will retain the blade in position and adequately support it in use without the necessity of screws and other such hardware.

It is an object of the present invention to provide an improved can opener having a plastic bag opener integrated therewith.

It is another object of the present invention to provide an improved can opener with a plastic bag opener attached thereto wherein said plastic bag opener may be manufactured and assembled easily and inexpensively.

It is still a further object of the present invention to provide an improved can opener with a plastic bag opener attached thereto wherein the housing containing the plastic bag opening assembly is easily removed to facilitate cleaning and replacement of the blade of the bag opener.

Another object of the present invention is to provide a simple and readily removable cutting mechanism as used for opening plastic bags within the plastic bag opener housing.

Further objects and advantages of the present invention will become apparent as the following description, procedures, and features of novelty which characterize the invention will be pointed out with particularity in the claims annexed to and forming a part of this specifications.

DESCRIPTION OF THE PREFERRED EMBODIMENT

Figures 1, 2, 3, 4, 5:
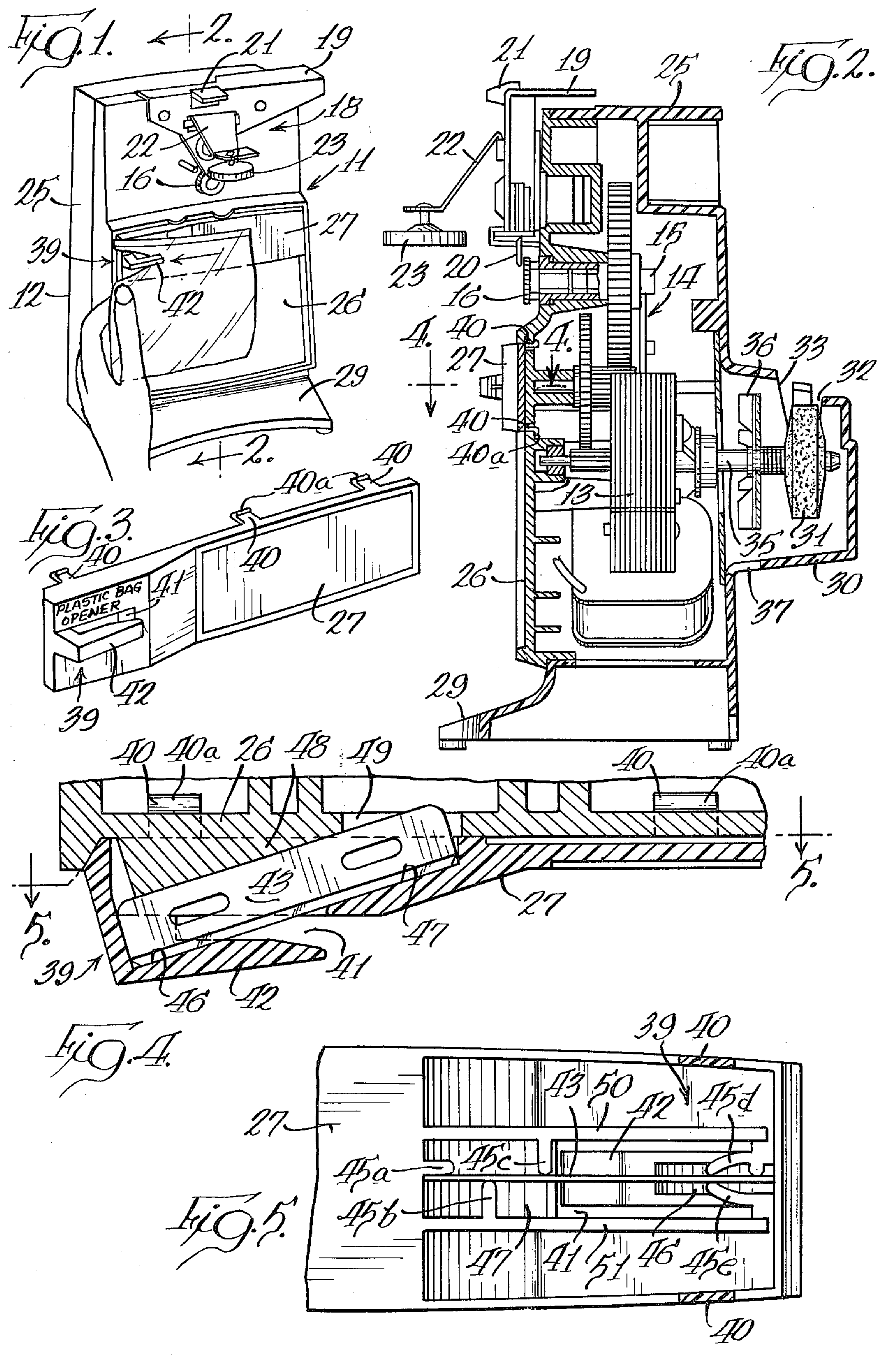
FIG. 1 is a perspective view of a can opener with a plastic bag opener embodying our invention.
FIG. 2 is a sectional view taken on line 2—2 of FIG. 1.
FIG. 3 is a perspective view of the plastic bag opener casing.
FIG. 4 is a sectional view taken on line 4—4 of FIG. 2.
FIG. 5 is a sectional view taken generally on line 5—5 of FIG. 3.

Referring now to the drawings, there is shown in FIG. 1 a combined can opener and knife sharpener with an attached plastic bag opener designated generally by reference numerial 11. The can opener 11 is conventional insofar as it includes a housing 12 which encloses a motor 13 which drives through a gear reduction 14, a feed wheel shaft 15 which supports on its outer end a serrated can rotating or feed wheel 16.

Cooperating with the feed wheel 16 to open or cut the lid of a can is a cutting mechanism 18. The cutting mechanism 18 includes a pivotally mounted manually operated lever 19 which supports a low type cutter 20. The cutter 20 is movable between the retracted or load position with the lever 19 in a generally vertical position and a cutting position as shown in FIG. 1 in which it overlaps the feed wheel 16 and the lever 19 extends generally horizontally.

Located at the top portion of the lever 19 is a release button 21 which when depressed, allows the user to remove the cutting mechanism 18 to facilitate the cleaning of the can opener 11. Also attached to the lever 19 and coordinated with the cutting mechanism 18 is a metal plate 22 which supports a magnetic assembly 23. The magnet assembly 23 is used to retain the lid of a can after it has been separated from the sides of the can.

The housing 12 of the can opener of the present invention is made up of two basic parts, one being a box-like portion 25 and the other a front plate 26. The front plate 26 may be designated the support plate since it carries all the mechanism of the can opener including the motor 13, the feed wheel shaft 15, the cutting mechanism 18, and also a bag opener casing 27. The front plate 26 and the box-like portion 25 cooperate to form an enclosure 28 within which the motor and reduction gearing are received.

The box-like portion 25 which is best shown in FIG. 2 is made of an inexpensive styrene plastic material since it performs little function except to enclose the mechanism carried by the front plate 26. The portion 25 is also formed with a forwardly projecting base 29 which provides the necessary support for the can opener preventing it from tipping forwardly when a can is received between the cutter 20 and the feed wheel 16, and force is being applied by the operator downwardly against the lever 19.

The portion 25 is also formed with a rearwardly projecting appendage 30 which serves to enclose a knife sharpener or grinding wheel 31. The appendage 30 is merely of suitable size to enclose the wheel 31 and includes angled slots 32 and 33 which are adequate to receive knife blades and guide them into proper engagement with the opposite faces of the grinding wheel 31.

The grinding wheel 31 is supported on the rearwardly extending end of motor shaft 35. Also supported on the shaft 35 and inwardly of the grinding wheel 31 is a fan 36 which circulates air across the motor 13 and outwardly through a downwardly facing opening 37 as best shown in FIG. 2.

As best shown in FIG. 1, there is located on the front of the can opener 11 a plastic bag opener casing 27 for use in cutting and opening the plastic bag containers which are increasingly being used to package various foods. There is located on the plastic bag opener casing and integrally formed therewith a plastic bag opener designated generally by reference numeral 39. The plastic bag opener 39 and bag opener casing 27 are best shown in FIG. 3. Returning for a moment to FIG. 1, it will be seen that the plastic bag opener 39 is conveniently located on the can opener front plate 26 in that it is easily accessible and in use avoids interference with other components of the can opener. Thus, the plastic bag opener 39 is positioned at a suitable height on the front plate so that when the bag is being opened as shown in FIG. 1, there is enough room below the opener 39 for the lower portion of the bag, and enough room between the opener 39 and the can opening mechanism, including the magnet assembly 23 and cutter 20, to allow adequate clearance for the top of the bag. Furthermore, so as to avoid interference with any cans being opened by the can opener 11, the bag opener 39 is displaced to one side of the housing 27.

In order to support and hold the plastic bag opener casing 27 onto the front plate 26, there are provided a number of plastic projections 40 extending from the rear of the casing 27, and latching tabs **40*a* located at the end of these projections as best shown in FIG. 3. To attach the plastic bag opener casing 27 onto the can opener 11, the plastic projections 40 are inserted through openings located in the front plate 26 and the tabs 40*a* will then latch in place therebehind as best shown in FIG. 2. The plastic projections 40 are slightly flexible and the tabs 40*a*** are formed with a gradual incline to the plane of the projections so as to allow easy removal and attachment of the plastic bag opener casing.

For use in actually cutting the plastic bags, there is provided a blade 43 located within the plastic bag opener 39. An opening 41 is formed in the bag opener 39 between a front guide member 42 and the body of the plastic bag opener casing 27. The opening 41 allows a plastic bag access to the blade 43 while the front guide member 42 will substantially cover and protect the blade so as to prevent accidental injury to the operator. The front guide member 42 is also made of adequate strength and design to support and put pressure on a plastic bag forcing it into engagement with the blade 43 when the bag is being opened by moving it to the left in the manner shown in FIG. 1.

The blade 43 is held in position within the plastic bag opener casing 27 by alternately located blade supports **45*a* through 45*e* as best shown in FIG. 5. As shown, 45*d* and 45*e* will adequately restrain one end of the blade from any lateral movement thereof, whereas the disposition of supports 45*a*, *b*, and *c* straddling the blade retains the other end of the blade in proper lateral alignment. In order to restrain the blade 43 against forward movement or longitudinal movement in the direction in which the plastic bag is being pulled, the blade abuts and is received against the back portion 46 of the front guide member 42 and the back portion 47 of the plastic bag opener casing 27 extending angularly as shown best in FIG. 4. A ramp-like projection 48 is formed on the front plate 26 to support the rear edge of the blade 43 when the blade and plastic bag opener casing 27 are properly positioned on the can opener. A slot 49 in the front plate 26 is provided to allow the corner of the blade 43 to extend into the can opener housing in proper position as shown in FIG. 4. As can be seen from the above description and accompanying figures, the blade 43 is held in position and sufficiently supported in use without need of any screws, pins or other extraneous hardware. In this manner the blade can be easily removed and replaced. Furthermore, with the various blade supporting elements being integrally formed with the plastic bag opener casing 27 and front plate 26** the manufacturing and assembly costs are quite low.

Supporting ribs 50 and 51 located on the inside of the plastic bag opener casing 27 as best shown in FIG. 5 serve both as a guard to prevent various foods and plastic scraps from falling in or getting caught inside of the casing 27 and also to give support to the blade supports **45*a* through 45*e*.**

While there has been shown and described a single embodiment of the present invention, it will be apparent to those skilled in the art that numerous changes and modifications may occur, and it is intended in the appended claims to cover all such changes and modifications which fall within the true spirit and scope of the present invention.

What is claimed as new and desired to be secured by Letters Patent of the United States is:

1. The combination of a bag opener with a motor driven can opener, said can opener being of the type having a housing enclosing an electric motor which is drivingly connected to a can rotating means, and cutting means movably mounted on said housing for engagement with the top of a can being opened, said bag opener comprising a bag opener casing; an elongated cutting blade having a sharpened edge extending the length thereof and contained within said casing; latching means removably securing said bag opener casing to said can opener housing; means in said casing for retaining said cutting blade against lateral displacement; means on said housing adapted to abutt the edge of said cutting blade opposite said sharpened edge thereof when said casing is positioned on said housing; said casing being formed with an opening exposing a portion of said sharpened edge of said cutting blade whereby said exposed portion may be used for opening a bag; and an arm extending from said casing and spaced forwardly of said opening for protecting the user from the exposed portion of said cutting blade.

2. The combination bag opener and can opener of claim 1 wherein said blade retaining means in said casing comprises spaced blade supports located on alternate sides of said blade; said blade supports being integrally formed within said bag opener casing, and said retaining means allowing easy replacement of said cutting blade.

3. The combination bag opener and can opener of claim 1 wherein said latching means is comprised of a plurality of resilient projections extending from said bag opener casing; latching tabs located at the terminal ends of said projections; a plurality of openings formed in said can opener housing to receive said projections with said latching tabs being resiliently engaged behind the edges of said opening thereby retaining said casing on said housing with said housing rigidly secured by and between said latching tabs and the body of said casing.

4. The combination of a bag opener with a motor driven can opener; said can opener being of the type having a housing enclosing an electric motor which is drivingly connected to a can rotating means; and cutting means movably mounted on said housing for engagement with the top of a can being opened, said bag opener comprising a casing; a cutting blade having a sharpened edge replaceably mounted in said casing; an opening formed in said casing exposing a portion of said sharpened edge of said cutting blade to permit access thereto by a bag to be opened; an arm extending from said casing and spaced forwardly of said opening whereby to protect the user from the exposed portion of said cutting blade; latching means for detachably securing said bag opener casing to said can opener housing; cooperating means in said casing and on said housing for supporting said cutting blade; said cooperating means including alternately located blade supports integrally formed within said bag opener casing; said supports retaining said blade in said casing while still allowing easy removal therefrom; an angular projection extending from said can opener housing abutting the edge of said cutting blade opposite said sharpened edge; a slot in said housing adjacent said angular projection to receive a corner of said blade; and a back side of said arm and said casing abutting the sharpened edge of said blade.

* * * * *